United States Patent Office 3,259,509
Patented July 5, 1966

3,259,509
REFRACTORY MATERIALS AND METHOD OF MAKING SAME
Vlado I. Matkovich, Youngstown, N.Y., and Ervin Colton, Wauwatosa, and James L. Peret, Milwaukee, Wis., assignors to Allis-Chalmers Manufacturing Company, Milwaukee, Wis.
No Drawing. Filed Jan. 26, 1962, Ser. No. 169,099
6 Claims. (Cl. 106—65)

This invention relates generally to the manufacture of refractory materials and, more particularly, to refractory materials which are characterized by a solid solution of aluminum nitride and silicon carbide and to new and improved methods of producing these materials so that they contain no free carbon.

In the present age of nuclear reactors, high speed missiles, jet or rocket propulsion engines, and other advancing technological fields, there are ever increasing needs for refractory structures and surfaces which are stable and strong at operating temperatures which are much higher than those heretofore employed. These refractories often must be capable of withstanding strong oxidizing or reducing atmospheres, ionizing radiation, high pressures or vacuums, or other severe or unusual conditions which ordinary materials of construction will not withstand.

Many advances have been made to provide new refractories which lend themselves to some or many of the severe applications now presented by modern technology. No presently available commercial refractory is capable of withstanding the conditions encountered in containing molten aluminum under high vacuum conditions, e.g., 1800° C. at 10 microns. Nor can any of the presently available commercial refractory materials exist for any appreciable length of time in contact with molten ferrous alloys.

The present invention is predicated upon the discovery that a material containing aluminum nitride and silicon carbide in solid solution and devoid of free carbon is, when manufactured in accordance with the present invention, capable of satisfying both of these needs to a remarkably unexpected extent.

Of course, aluminum nitride and silicon carbide are independently known. Silicon carbide has been employed quite satisfactorily in many refractory applications. However, silicon carbide lacks certain properties requisite for its successful application in the fields indicated. Similarly, aluminum nitride, as presently available, invariably contains alumina and free carbon, both of which detract from its successful application in the fields indicated.

Accordingly, it is a prime object of the present invention to provide an improved refractory material containing silicon carbide and aluminum nitride in a solid solution containing substantially no free carbon or alumina.

It is another object of the present invention to provide an improved refractory material which is especially suited for containing molten aluminum under high vacuum and high temperature conditions and for resisting molten ferrous metal.

It is another object of the present invention to provide an improved refractory material which is stable in the presence of carbonaceous materials even when subjected to high temperatures at atmospheric pressure.

Still a further object of the present invention is to provide an improved family of refractory materials containing aluminum nitride and silicon carbide in solution in which the molar relationship of the solvent and solute can be varied within preselected limits to alter the physical properties of the refractory produced thereby.

Still another object of the present invention is the provision of an improved method for producing aluminum nitride-silicon carbide solid solution having a variable formulation within preselected limits whereupon the resulting product may be easily and readily adapted to suit the particular application in which it is to be employed.

A still further object of the present invention is the provision of an improved aluminum nitride-type of material which is devoid of free carbon.

These and still further objects as shall hereinafter appear are fulfilled to a remarkably unexpected extent by the present invention as shall be discerned from the following detailed description of embodiments exemplifying the invention and indicating the progress resulting therefrom.

One practice of the present invention, which forms a vastly improved refractory material product, comprises admixing aluminum oxide, a solid carbonaceous material such for example as graphite, lampblack or carbon; and elemental silicon, to form a mixture; heating that mixture to a temperature of at least 1200° C. and preferably in the range of 1600 to 2200° C. but, in any event, not over 2400° C. while carbon monoxide evolves therefrom and until the evolution of carbon monoxide subsides. The evolution of carbon monoxide is readily detected by already refined art as with a gas analyzer or by burning the exit gases and observing the color and intensity of the flame. When the evolution of carbon monoxide substantially subsides, a reaction product is formed which consists of an aluminum nitride-silicon carbide solid solution and substantially no free carbon.

While, as indicated, gas analyzers may be utilized to detect the duration of the carbon monoxide evolution, it is not necessary to use expensive equipment since the color of the burning exit gases will evidence a change of carbon monoxide content. Thus, for example, while carbon monoxide is being evolved from the reaction, the exit gases will burn with a dull blue color. Upon the subsiding of the carbon monoxide evolution, the flame of the burning exit gases will change from the dull blue color to a bright yellow flame.

In a preferred practice of the present invention, the mixture containing aluminum oxide, carbon, and silicon will be formed into either pellets or briquettes although it may be used in powder form if desired.

After heating the mixture as indicated to complete the evolution of carbon monoxide, the reaction product may be further stabilized by heating at a temperature of at least 2000° C., but not over 2400° C. for a short period of time. In stabilizing the product, the duration of the stabilization is inversely proportional to the temperature selected. Thus, as the stabilizing temperature approaches 2400° C., the time of stabilization may be substantially reduced. The product thus formed is a homogeneous, single phase substance.

In a more particular practice of the present invention a change in X-ray powder characteristics of the final product is observable as the weight percent silicon carbide increases, as shall hereinafter be described in detail.

Specifically, if the silicon carbide content of the final aluminum nitride-silicon carbide product is low, for example, less than about 14 weight percent, which corresponds to a composition ratio of about 6AlN:1SiC, the X-ray powder diffraction pattern of this product shows only a single phase pattern similar to aluminum nitride. Similarly, an aluminum nitride type X-ray powder pattern is also observed when our product contains 10.9 weight percent silicon carbide (corresponding to a composition ratio of 8AlN:1SiC), 8.9 weight percent silicon carbide (corresponding to 10AlN:SiC), and 4.7 weight percent silicon carbide (corresponding to 20AlN:SiC)

when the reagents are mixed and treated in the manner herein described.

As the weight percent of silicon carbide in the product increases, for example, reaches about 15–20, the X-ray powder pattern is observed to be distorted from the original pattern described above.

In crystallographic work it is known that substances can form solid solutions such as when the atoms of an element in the crystalline lattice of a compound are partially replaced by the atoms of another element. The resultant solution normally has properties which differ from those of its constituents but a structure which is modified only in lattice parameters and is otherwise common to the original materials. Thus, we have observed that there is a crystallographic form of silicon carbide, herein called "wurtzite," whose parameters closely match those for pure aluminum nitride, as shown in Table I.

TABLE I.—CRYSTALLOGRAPHIC DATA FOR AlN AND WURTZITE

| Compound | Space Group | Lattice Dimensions, A. | |
|---|---|---|---|
| | | a Axis | c Axis |
| AlN | $C_{6v}^4$ | 3.114 | 4.986 |
| Wurtzite | $C_{6v}^4$ | 3.076 | 5.048 |

Thus, as the silicon carbide content of our aluminum nitride-silicon carbide product increases and the mixture has been heated in accordance with our teachings, preferably between about 1600 and 2200° C., the product which forms shows an X-ray powder pattern which is similar to that for AlN but which is distorted from the AlN pattern. That is, the lattice dimensions of the aluminum nitride-silicon carbide unit cell are somewhat different from that of pure aluminum nitride although, again, only a single X-ray pattern is observed. The major X-ray lines of this pattern are shifted from those of the first pattern and the amount of shift depends upon the amount of SiC actually present in the solid solution.

TABLE II.—X-RAY POWDER DIFFRACTION LINES FOR AlN AND AlN:SiC

| hkl | d (Observed), A. | | I/I₀ | |
|---|---|---|---|---|
| | AlN | AlN:SiC | AlN | AlN:SiC |
| 100 | 2.70 | 2.68 | vs | s |
| 002 | 2.49 | 2.51 | ms | ms |
| 101 | 2.37 | 2.37 | ms | s |
| 102 | 1.829 | 1.835 | m | m |
| 110 | 1.557 | 1.550 | m | vs |
| 103 | 1.414 | 1.418 | m | vs |
| 200 | 1.348 | 1.340 | vw | w |
| 112 | 1.320 | 1.318 | w | s |
| 201 | 1.301 | 1.295 | vw | m |
| 202 | 1.186 | 1.183 | vw | w |
| 203 | 1.047 | 1.046 | vw | s |
| 210 | 1.019 | 1.014 | vw | w |
| 211 | 0.9984 | 0.9940 | vw | m | s—strong; m—medium; v—very; w—weak.

To prepare the aluminum nitride-silicon carbide solid solution so that it has a high aluminum nitride content, we react a mixture of aluminum oxide, carbon, and silicon in a nitrogenous atmosphere while maintaining intimate contact between the mixture and the incoming gas.

A vertical, inductively heated graphite furnace has been found quite satisfactory for this operation.

The proper ratio of components, determined by conventional stoichiometry for the product formulation desired, are mixed and, while either in powder form or as compacts of preselected geometry, the mixture is heated in a rapid stream of nitrogen-bearing gas. For effectiveness of the reaction either nitrogen or cracked ammonia will provide a satisfactory atmosphere. Some slight amount of sintering may occur during the reaction causing some of the powders to adhere into masses and somewhat slowing gas penetration. This can be avoided by slight agitation or by forming the original mixture into porous briquettes as indicated above.

Temperatures of about 1200° C. but not over 2400° C. and preferably from 1400 to 2200° C. may be used although from about 1600 to 2000° C. is preferred with the most convenient heating zone being about 1800 to 1900° C. Table III shows the effect of heating a mixture corresponding to a ratio of 8AlN and 1SiC at 1800° C. for a short period of time, it being remembered that duration of heating is, within the temperature limits described, an inverse function of the temperature employed.

TABLE III.—EFFECT OF TEMPERATURE ON THE FORMATION OF THE SOLID SOLUTION 8AlN:SiC

| Reactants (moles) | Temp. of Reaction,° C. | X-Ray Analysis of Product |
|---|---|---|
| 8AlN+Si+C | 1,600 | AlN    s<br>β-SiC  vw |
| 8AlN+Si+C | 1,700 | AlN    s<br>β-SiC  vw |
| 8AlN+Si+C | 1,800 | AlN    s<br>No trace lines |
| 8AlN+Si+C | 1,900 | AlN    s<br>No trace lines |

S—strong; vw—very weak.

The proportions of aluminum oxide, carbon, and silicon used depend, of course, upon the particular product desired. If, for example, 91 weight percent aluminum nitride is desired, the following stoichiometry would be followed:

$$5Al_2O_3 + 16C + Si + 5N_2 \rightarrow 10AlN{:}SiC + 15CO$$

In actual practice a slight excess of silicon is desirable in order to compensate for the losses which are encountered during the heating sequence.

It has been determined that the course of the reaction can be followed by weighing the product formed. Since carbon monoxide is volatile, it is lost as the gaseous product of reaction. In every case, regardless of the composition of the specific product formed (i.e., 20AlN:SiC or 6AlN:SiC), the amount of carbon monoxide lost is about three times (on a molar basis) the amount of aluminum oxide used, all of the oxygen in aluminum oxide being converted to carbon monoxide.

Under certain conditions, it is desired to stabilize the reaction product. Thus, after the reactants, in the form of powders, are intimately mixed, compressed into briquettes, charged into a graphite crucible, and heated by induction to about 1900° C. in a nitrogenous atmosphere until the reaction is complete, as evidenced by diminution of the size and color of the flame at the gas exit port the temperature is then raised to about 2000° C. for a short time, i.e., on the order of five to ten minutes.

It is believed important to maintain good contact between the reaction briquettes and the incoming gas. If the reaction is somehow incomplete, as evidenced by a product weight greater than that calculated, or by the appearance of dark, unreacted carbon, the reaction can be readily completed by reheating the product in nitrogen.

The process for preparing aluminum nitride-silicon carbide solid solutions having a substantial content of silicon carbide, e.g., 3AlN:SiC, is carried out in the same manner. Thus, aluminum oxide, carbon and silicon are admixed, briquetted if desired, and heated in a nitrogenous atmosphere. The same vertical induction furnace described previously is suitable.

It is preferred, in the case of solid solutions containing high amounts of silicon carbide, to follow the initial heating by raising the temperature of the reaction to about 2200° C. This final heat assures complete solid solution formation.

Considering the reaction product as $xAlN{:}SiC$ where $x$ is from 1 to 20, the value of $x$ should be large, for example greater than 4, where a material resistant to molten aluminum in vacuum is desired. $x$ may be 4 or less when strength and resistance to molten iron are the properties needed. In admixing the reactants prior to heating, it should again be noted that the ratios of the reactants should correspond to the stoichiometric ratio of the desired solid solution. Therefore, in order to produce a product of $x$AlN:SiC where $x$ is anywhere from 1 to 20, the following equation must be satisfied:

$$\frac{x}{2} Al_2O_3 + \left(\frac{3x}{2}+1\right) C + Si + \frac{x}{2} N_2 \rightarrow x AlN:SiC + \frac{3x}{2} CO$$

Thus, anywhere from ½ to 10 moles of aluminum oxide would have to be used per mole of silicon to attain $x$AlN:SiC where $x$ is from 1 to 20. The quantity of carbon used in moles would have to be equal to 3 times the number of moles of aluminum oxide used plus one. For example, to produce AlN:SiC from one mole of silicon it would require ½ mole of aluminum oxide and 2½ moles of carbon. To produce 20AlN:SiC from one mole of silicon would require 10 moles of aluminum oxide and 31 moles of carbon.

The following examples are presented to further illustrate the processes of the present invention to aid in its understanding and are not intended as a limitation thereof.

*Example 1*

Aluminum oxide powder (408 gms., 4 moles), lampblack (156 gms., 13 moles), and powdered silicon (36 gms. of 98 percent pure, 1.25 moles) were intimately mixed in a ball mill for three hours. The homogeneous powder was then compressed into briquettes 2½ inches in diameter and about 1 inch thick under 2500 pounds pressure. The briquettes were loaded into a graphite crucible, which in turn was placed inside of a closed, insulated graphite sleeve, and heated by induction at 1750–1800° C. for about two hours while a stream of nitrogen gas at 30 ft.³/hr. was introduced from the top.

X-ray powder diffraction examination of the product showed only an aluminum nitride type pattern. The reaction yielded 385 grams of product having an Si:C atomic ratio of 0.98 and the following chemical analysis (in weight percent): Si—7.96, C—3.50.

*Example 2*

A well blended mixture of 2040 gms. (20 moles) of aluminum oxide, 780 gms. (65 moles) of lampblack, and 180 gms. (6.25 moles) of 98 percent pure silicon was prepared. The mixture was pelletized into ¼ inch diameter spheres, using water as a binder, and 106 gms. of pellets were heated by induction in a graphite crucible in a nitrogen atmosphere for one hour at 1800 to 1850° C. X-ray analysis of the product showed only a single phase of the aluminum nitride solid solution pattern. The reaction yielded 64 grams having an Si:C atomic ratio of 0.98 and the following chemical analysis (in weight percent): Si—7.3, C—3.2.

*Example 3*

A well ball-milled mixture of finely powdered aluminum oxide, graphite and silicon was prepared in accordance with the equation:

$$10Al_2O_3 + 1.25Si + 31C + 10N_2 \rightarrow 20AlN:SiC + 30CO$$

A charge of 988 gms. was formed into briquettes 2½ inches in diameter by 1 inch thick and heated inductively in nitrogen for 1½ hours at 1780° C. and then raised to 2000° C. for ten minutes. After cooling in nitrogen, the very light gray reaction product weighed 543 gms. X-ray powder examination of the product showed only a single phase of the aluminum nitride solid solution pattern. Chemical analysis (in weight percent) showed Al, 62.6 percent; Si, 2.9 percent; and C, 1.6 percent.

*Example 4*

Aluminum oxide (408 gms., 4 moles) and carbon (192 gms., 12 moles) were intimately mixed and heated by induction at 2000° C. in a nitrogen atmosphere for two hours. The cooled product was powdered and well mixed with powdered silicon (112 gms., 4 moles) and then heated in nitrogen for two hours at 2100–2200° C. The gray reaction product was shown by X-ray powder patterns to correspond to a ratio of AlN:SiC of from 1:3, i.e., approximately 2AlN:SiC.

*Example 5*

Aluminum oxide, lampblack and silicon dioxide were well mixed in accordance with the equation requirements:

$$Al_2O_3 + SiO_2 + 6C + N_2 \rightarrow 2AlN:SiC + 5CO$$

The mixture was briquetted into 2 inch diameter by 1 inch thick pieces, using water as a binder. The briquettes were dried and 531 grams were heated inductively in graphite in a nitrogen atmosphere at 1700–1750° C. for about 2 hours after which the temperature was raised to 2100° C. for 30 minutes. The light gray product was shown by X-ray powder patterns to be approximately 2AlN:SiC. The yield was 249 gms. of a product which analyzed (in weight percent) to be: aluminum, 43.4; silicon, 23.1; and carbon, 10.3.

*Example 6*

Powdered material, analyzing approximately AlN:SiC by X-ray powder patterns, was cold pressed into a bar about 2 inches by 4 inches. The pressed bar was then pressed again hydrostatically in oil under 40,000 p.s.i. to give a strong bar readily machinable. Threads were put into the bar, and it was then sintered slowly in a nitrogen atmosphere at 1800–2000° C. for about 2 hours. The finished bar was fashioned into an impeller which was attached to a handle of the same material, by means of the threads, to form a paddle. The paddle was then heated with pieces of cast iron until the iron was entirely liquid and maintained at 1535–1565° C. The liquid iron was then stirred with the paddle. About seven pounds of molten iron was stirred for 2¼ hours while 50 gms. of a desulfurization agent, calcium carbide, was added slowly to the stirring molten iron. No corrosive effect on the paddle was noticed. In all, the paddle was immersed in and stirred the molten iron for 2¾ hours.

*Example 7*

Powdered material corresponding approximately to 8AlN:SiC was cold pressed without a binder into a pellet weighing 14.13 grams. This was placed in an alumina crucible and heated at about 1700° C. and ten microns for two hours by means of tungsten resistance elements. The final product weighed 13.96 grams thus showing that the material is stable at high temperature and reduced pressure.

From the foregoing it becomes apparent that new refractory compounds and methods of preparing them have been herein described which fulfill all of the aforestated objectives to a remarkably unexpected extent and in a totally unobvious fashion.

It is, of course, understood that such alterations, modifications and applications as will readily occur to the artisan when confronted with this disclosure are intended within the spirit of this invention, especially as it is defined by the scope of the claims appended hereto.

Having now particularly described and ascertained the nature of our said invention and the manner in which it is to be performed, we declare that what we claim is:

1. The process for making a refractory reaction product consisting essentially of aluminum nitride and silicon carbide in solid solution and containing substantially no free carbon comprising: admixing aluminum oxide and silicon with a solid carbonaceous material selected from the group consisting of graphite, lampblack and carbon to form a mixture in such stoichiometric proportions as will yield a product of $x$AlN:SiC where $x$ is from 1 to 20; heating said mixture in a nitrogenous atmosphere to a temperature of at least 1200° C. but not over 2400° C. until the evolution of carbon monoxide therefrom substantially completely subsides; and cooling said reaction product.

2. The process for making a refractory reaction product consisting essentially of aluminum nitride and silicon carbide in solid solution and containing substantially no free carbon comprising: admixing aluminum oxide and silicon with a solid carbonaceous material selected from the group consisting of graphite, lampblack and carbon to form a mixture in such stoichiometric proportions as will yield a product of $x$AlN:SiC where $x$ is from 1 to 20; heating said mixture in a nitrogenous atmosphere to a temperature of from about 1600° C. to about 2000° C. until the evolution of carbon monoxide therefrom substantially completely subsides; and cooling said reaction product.

3. The process for making a refractory reaction product consisting essentially of aluminum nitride and silicon carbide in solid solution and containing substantially no free carbon comprising: admixing aluminum oxide, silicon and a solid carbonaceous material selected from the group consisting of graphite, lampblack and carbon to form a mixture in such stoichiometric proportions as will yield a product of $x$AlN:SiC where $x$ is from 1 to 20; heating said mixture in a nitrogenous atmosphere to a temperature of from about 1400° C. to about 2200° C. until the evolution of carbon monoxide therefrom substantially completely subsides; and cooling said reaction product, said silicon carbide comprising not more than about 50 weight percent of said product.

4. The process for making a refractory reaction product consisting essentially of aluminum nitride and silicon carbide in solid solution and containing substantially no free carbon comprising: admixing sufficient aluminum oxide, silicon and a solid carbonaceous material selected from the group consisting of graphite, lampblack and carbon to satisfy the equation:

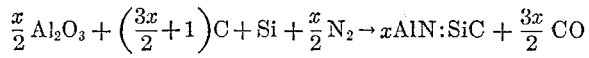

$$\frac{x}{2}Al_2O_3 + \left(\frac{3x}{2}+1\right)C + Si + \frac{x}{2}N_2 \rightarrow x AlN:SiC + \frac{3x}{2}CO$$

where $x$ is from 1 to 20; heating said mixture in a nitrogenous atmosphere to a temperature of from about 1400° C. to about 2200° C., until the evolution of carbon monoxide therefrom substantially completely subsides, to form said reaction product.

5. The process for making a refractory reaction product consisting essentially of aluminum nitride and silicon carbide in solid solution and containing substantially no free carbon comprising: admixing aluminum oxide and silicon with a solid carbonaceous material selected from the group consisting of graphite, lampblack and carbon to form a mixture in such stoichiometric proportions as will yield a product of $x$AlN:SiC where $x$ is from 1 to 20; heating said mixture in a nitrogenous atmosphere to a temperature of at least 1200° C. but not over 2400° C. to react said aluminum oxide, silicon, carbonaceous material and nitrogen to form an aluminum nitride-silicon carbide solid solution and carbon monoxide; maintaining said reaction at said temperature until all of said carbon monoxide is substantially completely evolved; and cooling said reaction product.

6. An aluminum nitride-silicon carbide solid solution having the formula $x$AlN:SiC where $x$ is from 1 to 20.

References Cited by the Examiner
UNITED STATES PATENTS 2,406,275  8/1946  Wejnarth _____ 106—44
3,108,887  10/1963  Lenie et al. _____ 106—65

OTHER REFERENCES

Schwarzkopf et al., Refractory Hard Metals, The MacMillan Co., New York, 1953, pages 223–224.

TOBIAS E. LEVOW, Primary Examiner.

JOHN H. MACK, Examiner.

J. POER, Assistant Examiner.